United States Patent
Pascucci

[19]

[11] Patent Number: 5,805,435
[45] Date of Patent: Sep. 8, 1998

[54] VOLTAGE BOOSTER FOR MEMORY DEVICES

[75] Inventor: Luigi Pascucci, Sesto San Giovanni, Italy

[73] Assignee: SGS-Thomson Microelectronics S.r.l., Agrate Brianza, Italy

[21] Appl. No.: 824,958

[22] Filed: Mar. 27, 1997

[30] Foreign Application Priority Data

Mar. 29, 1996 [EP] European Pat. Off. .............. 96830179

[51] Int. Cl.[6] .................................................. H02M 3/18
[52] U.S. Cl. ............................................. 363/59; 363/60
[58] Field of Search .............................. 327/536; 363/59, 363/60

[56] References Cited

U.S. PATENT DOCUMENTS

| | | | |
|---|---|---|---|
| 4,634,464 | 1/1987 | Cranford | 365/226 |
| 4,752,699 | 6/1988 | Crandord et al. | 363/60 |
| 5,193,198 | 3/1993 | Yokouchi | 363/60 |
| 5,392,205 | 2/1995 | Zavaleta | 363/59 |
| 5,526,253 | 6/1996 | Duley | 363/59 |

*Primary Examiner*—Jeffrey L. Sterrett
*Attorney, Agent, or Firm*—Greenfield & Sacks, P.C.

[57] ABSTRACT

A device includes a first line at the supply voltage; a second line at the boost voltage; a booster stage; a supply detecting stage connected to the first line and generating a first level signal when the supply voltage exceeds a first predetermined level; a boost detecting stage connected to the second line and generating a second level signal when the boost voltage exceeds a second predetermined level; a regulating stage enabled by the boost detecting stage; and a pump control stage, which generates a regulating enabling signal for the regulating stage in the absence of the first level signal and in the presence of an enabling signal enabling the boost condition. The regulating stage generates a regulating signal in the presence of the second level signal and the regulating enabling signal, when the boost voltage exceeds a third predetermined level; and the pump control stage generates a pump activating signal for the booster stage in the absence of the first level signal and the regulating signal.

28 Claims, 5 Drawing Sheets

5,805,435

VOLTAGE BOOSTER FOR MEMORY DEVICES

BACKGROUND OF THE INVENTION

1. Field of the Invention

The present invention relates to a voltage booster for memory devices.

2. Discussion of the Related Art

As is known, memory devices operating at such a low voltage as not to permit direct biasing of the word lines to read the selected cells are provided with voltage boosters for generating a voltage higher than the supply voltage.

Known booster devices are invariably rigid solutions incapable of adapting to different operating conditions (e.g., different supply voltages), and either present high power consumption or a slow response in switching to different operating modes (typically, from standby).

SUMMARY OF THE INVENTION

It is an object of the present invention to provide a voltage booster device which may be enabled and configured flexibly, is turned on when the supply voltage is low, is turned off automatically when the low supply voltage condition ceases, presents zero power consumption when disabled, and is capable of controlling operating conditions with no delay, by being turned on immediately after the memory device is turned on and before the first reading is performed.

According to the present invention, there is provided a voltage booster device for memory devices.

According to one aspect of the invention, a voltage booster device for a memory device includes a first line at a first reference potential, a second line at a second reference potential and a first voltage booster stage connected to the first and second lines. The voltage booster device further includes a supply detecting stage (for generating a first level signal when the first reference potential exceeds a first predetermined level) connected to the first line, a boost detecting stage (for generating a second level signal when the second reference potential exceeds a second predetermined level) connected to the second line and a regulating stage connected to the second line and having an enabling input connected to the boost detecting stage. A pump control stage (for generating a regulating activating signal for activating the regulating stage in the absence of the first level signal) is connected to the supply and boost detecting stages, to the regulating stage and to the first voltage booster stage.

A boost control stage is also included in the device according to this aspect. The boost control stage includes boost self-activating means (receiving a power-on reset signal, the first level signal and the second level signal) for generating an activating signal, and boost enabling means for generating an enabling signal for the pump control stage, the supply detecting stage and the boost detecting stage in the absence of the power-on reset signal and the first and second level signals and in the presence of the activating signal. The regulating stage generates a regulating signal in the presence of the second level signal and the regulating activating signal, and when the second reference potential exceeds a third predetermined level; and the pump control stage generates a first pump activating signal for the first booster stage in the absence of the first level signal and the regulating signal.

According to another aspect of the invention, a voltage booster circuit for a memory device includes a first voltage booster stage, a first voltage level detecting stage and a boost control stage. The first voltage booster stage receives a first voltage and provides a second voltage on a boost line that is greater than the first voltage. The first voltage level detecting stage receives the first voltage and provides a first output signal in a first state when the first voltage exceeds a first threshold voltage level. And the boost control stage, responsive to the first output signal being in the first state, causes the first voltage booster stage to be disabled and causes the first voltage to be provided on the boost line.

According to another aspect, a voltage booster circuit includes a first voltage booster stage and a first voltage level detecting stage. The first voltage booster stage receives a first voltage and provides a second voltage on a boost line that is greater than the first voltage. The first voltage level detecting stage receives the first voltage and provides a first output signal in a first state when the first voltage exceeds a first threshold voltage level. The voltage booster circuit according to this aspect also includes means for, responsive to the first output signal being in the first state, causing the first voltage booster stage to be disabled and the first voltage to be provided on the boost line.

According to yet another aspect of the invention, a method for controlling a voltage provided to a memory device includes the steps of: (a) providing a supply voltage to a voltage booster stage that provides a boosted voltage to boost line that is higher than the supply voltage, (b) providing the supply voltage to a supply detecting stage that provides an output signal in a particular state when the supply voltage is greater than a threshold voltage level, and (c) responsive to the output signal being in the particular state, disabling the voltage booster stage and providing the supply voltage on the boost line.

DETAILED DESCRIPTION

Figure 1:
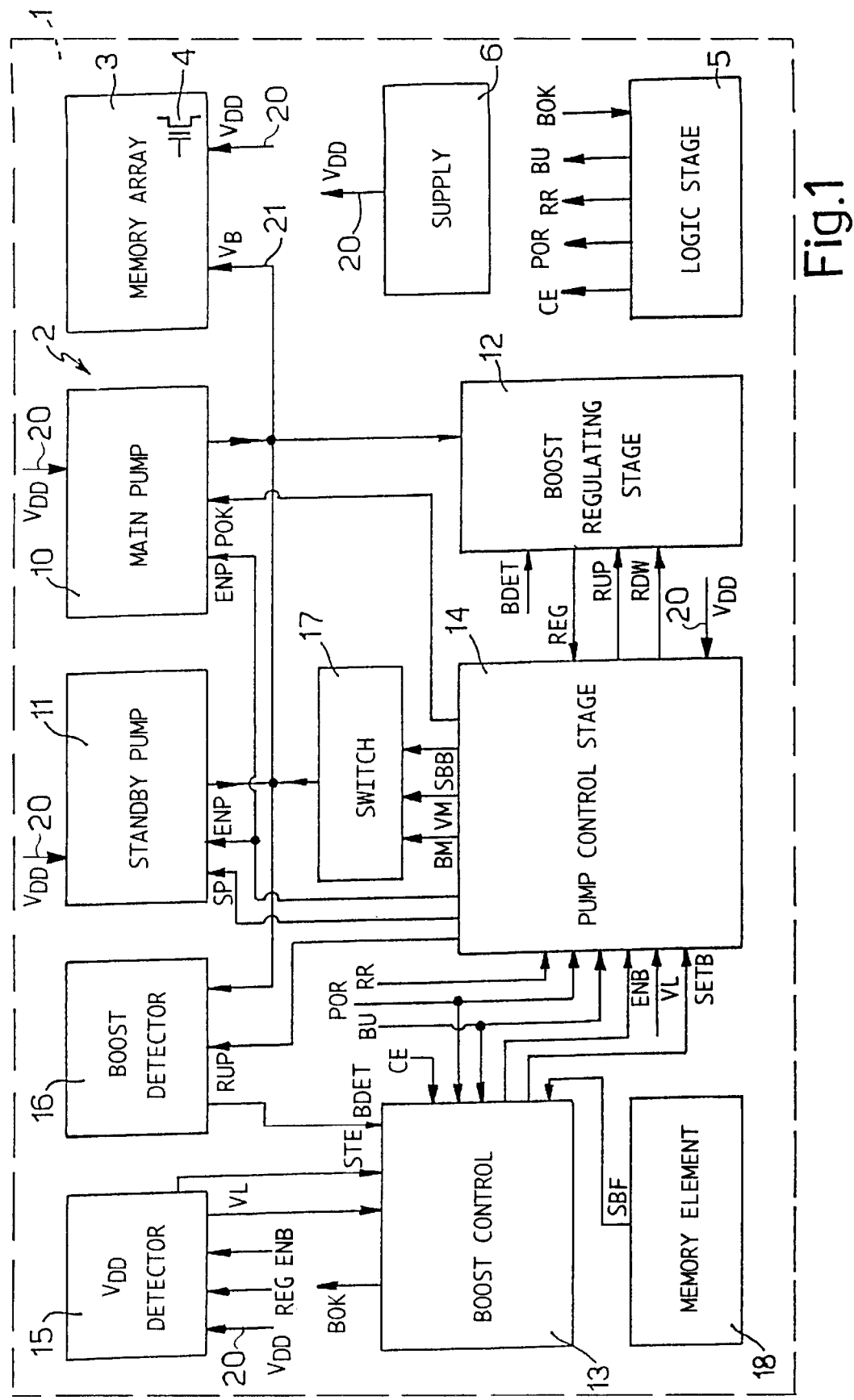
FIG. 1 shows an overall block diagram of a memory device comprising the booster device according to one embodiment of the invention.

FIG. 1 indicates a memory device 1 comprising, for example, a nonvolatile memory such as an EPROM, of which, only the parts relevant to the present invention are shown.

Memory 1 comprises a voltage booster device 2; a memory array 3 including a number of memory cells 4; a logic stage 5 incorporating all the memory timing and control components not involved in controlling the boost functions; and supply stage 6.

Device 2, in turn, comprises a main pump 10; a standby pump 11; a boost regulating stage 12; a boost control stage 13; a pump control stage 14; a supply detecting stage 15; a boost detecting stage 16; a switching circuit 17; and a non volatile memory element 18, e.g., comprising a UPROM memory cell.

More specifically, and in a known manner, supply stage 6 generates a supply voltage $V_{DD}$ which is supplied, in a manner not shown, over line 20 to all the other stages of memory 1. Logic stage 5 generates a signal CE for enabling memory 1; a power-on reset signal POR for switching all the memory circuits to a known predetermined condition when the memory is turned on; a signal RESISTOR indicating memory array 3 is being read; and a signal BU indicating memory array 3 is being programmed; and is, in turn, supplied by boost control stage 13 with a signal BOK confirming a sufficient (supply or boost) voltage level to read cells 4.

Main pump 10 receives an enabling signal ENP and a main pump activating signal POK from pump control stage 14; standby pump 11 receives enabling signal ENP and a standby pump activating signal SP from pump control stage 14; and both pumps 10 and 11 are connected to a boost line 21 at voltage $V_B$.

Boost regulating stage 12 receives a signal BDET (indicating the predetermined boost level has been reached) from boost detecting stage 16, signals RUP and RDW (for enabling and disabling regulation of the boost line respectively) from pump control stage 14, and itself generates an active regulating signal REG.

Boost control stage 13 receives a signal VL (low supply voltage) and a signal STE (for disabling the autoboost procedure enabled automatically when the memory is turned on) from supply detecting stage 15, signal BDET from boost detecting stage 16, signals CE, BU and POR from logic stage 5, a signal SBF from memory element 18, and itself generates signals BOK, SETB (boost enable) and ENB (which is enabled following initial power-on reset and when the memory is active, and is disabled during standby or in the event of forced disabling of the booster).

Pump control stage 14 receives signals RR, BU, POR, VL, SETB, REG and ENB, and generates signals RUP, RDW, BM (indicating boost operating mode), VM (indicating high-voltage operating mode) and SBB (for memorizing the operating or non-operating condition of the booster).

Supply detecting stage 15 receives signals REG, ENB and supply voltage $V_{DD}$, and generates signals VL and STE.

Boost detecting stage 16 receives signal RUP, generates signal BDET, and is connected to boost line 21.

Switching circuit 17 receives signals BM, VM and SBB, and is connected to boost line 21.

Nonvolatile memory element 18 generates signal SBF.

When the FIG. 1 memory is turned on, the high POR signal resets the circuits (signals SETB, ENB, BOK, ENP, POK, SP, BDET, RUP, SBB and VM are set low, and signals VL, REG, RDW, STE and BM are set high) to set the supply operating mode, so that switching circuit 17 connects boost line 21 to supply line 20 and the pumps are turned off. When the POR signal switches to low after turn-on, and in the absence of disabling conditions (stored by SBF), SETB switches to set the booster, and signal ENB switches to enable the autoboost condition. At the same time, pump control stage 14 is set to boost mode, turns on both pumps 10 and 11 via signals ENP, POK and SP, and controls switching circuit 17 via signals VM, BM and SBB until it disconnects boost line 21 from supply line 20. The switching of signal ENB also enables detecting stages 15 and 16.

As supply voltage $V_{DD}$ increases, while pumps 10 and 11 are still turned on, various situations arise, depending on whether memory 1 operates at low (3 V) or high (5 V) voltage, and depending on the speed with which the supply voltage increases.

If memory 1 operates at high voltage, $V_{DD}$, then, as the supply voltage increases, it eventually reaches the predetermined threshold value of supply detecting stage 15, which switches VL to low, thus switching pump control stage 14. Pump control stage 14 turns off the pumps by switching signals ENP, POK and SP to low, controls switching circuit 17 so that it connects boost line 21 to supply line 20, memorizes the present operating condition (SBB low), and disables boost detecting stage 16 and boost regulating stage 12 via low signal RUP. Also, boost control stage 13 switches signal BOK to indicate a sufficient read supply has been reached, and supply detecting stage 15 disables the autoboost condition by switching signal STE to low.

Conversely, if the memory operates at low voltage, signal VL is not switched, and boost line 21, pulled up by pumps 10 and 11 which have not been turned off, eventually exceeds the predetermined value of boost detecting stage 16, which therefore switches signal BDET to high. Boost regulating stage 12, already enabled via signal RUP from pump control stage 14 (still in boost mode), is therefore enabled and commences its regulating function, which is scanned by the switching sequence of signal REG between high and low. The first high-to-low switch of signal REG provides, with a given delay, for disabling supply detecting stage 15, which keeps signal VL high and, as previously mentioned, switches signal STE to disable the autoboost condition. And each time signal REG switches to low, it switches signals SP and POK to low to temporarily turn off the pumps, but with no change in the boost operating mode condition of the pump control stage, so that, when voltage $V_B$ on boost line 21 falls below the predetermined threshold, low-to-high switching of signal REG turns the pumps back on.

In the event memory 1 operates at high voltage, but supply voltage $V_{DD}$ is slow to increase, boost voltage $V_B$ may exceed its threshold value so that boost detecting stage 16 is triggered before supply detecting stage 15. In view of the delay, however, between the instant at which boost detecting stage 16 is triggered and signal REG switches the first time, and the instant at which the trailing edge of signal REG is received and supply detecting stage 15 is turned off, if supply line 20 manages to reach its predetermined threshold value before detecting stage 15 is turned off (so that signal VL also switches), then the device will switch to high-voltage operating mode, boost regulating stage 12 will be turned off, and pump control stage 14 will switch as described above.

When memory 1 switches to standby, logic stage 5 switches signal CE to low, and boost control stage 13, no longer sustained by the autoboost situation disabled previously, switches signal ENB to low. Depending on the operating situation prior to the memory switching to standby (memorized in pump control stage 14), this provides for keeping both pumps 10 and 11 off, if the memory was operating in high-voltage mode, and for keeping standby pump 11 on and turning off main pump 10, if the memory was operating in boost mode.

When the memory switches from standby, boost control stage 13 switches signal ENB to high to reactivate the supply voltage $V_{DD}$ and boost voltage $V_B$ detecting functions of stages 15 and 16, respectively; pump control stage 14 adapts to the existing condition, in the same way as after power-on; and regulation is at least temporarily blocked by the high state of signal BDET, until the device reaches the required operating condition, in the same way as described above relative to when the POR signal switches to low, except that in this case the autoboost procedure remains disabled.

When signal BU switches to low during programming, pump control stage 13 disables pumps 10 and 11 via signals ENP, POK and SP; and when signal BU switches back to high at the end of programming, the whole of memory device 1 is reactivated, thus reactivating the autoboost procedure and detection of supply and boost voltages $V_{DD}$ and $V_B$ as by the POR signal when the device is turned on.

The structure and operation of the various stages of device 1 will now be described in detail.

As stated, boost regulating stage 12 provides for generating regulating signal REG, which, depending on its logic stage, enables or disables pumps 10 and 11 to maintain an optimum level of boost voltage $V_B$. Stage 12, the structure of which is not shown in detail, substantially comprises a threshold element, which compares the boost voltage $V_B$ on boost line 21 with a predetermined threshold value, generates a high output signal REG as long as $V_B$ is below the threshold, and switches signal REG to low as soon as $V_B$ exceeds the threshold. Stage 12 is enabled by signal RUP and disabled by signal RDW; and high-to-low switching of output signal REG is only permitted after signal BDET switches to low, i.e., indicating the boost line has reached the minimum operating level determined by boost detecting stage 16. An advantageous embodiment of a regulating stage capable of setting an optimum boost level for reading the cells as a function of their conductivity, and using an actual memory cell as the threshold element to appropriately simulate the condition of memory cells 3, is described, for example, in European Patent Application n. 96830026.9 filed on 24 Jan. 1996 by the present Applicant incorporated herein by reference.

Figure 2:
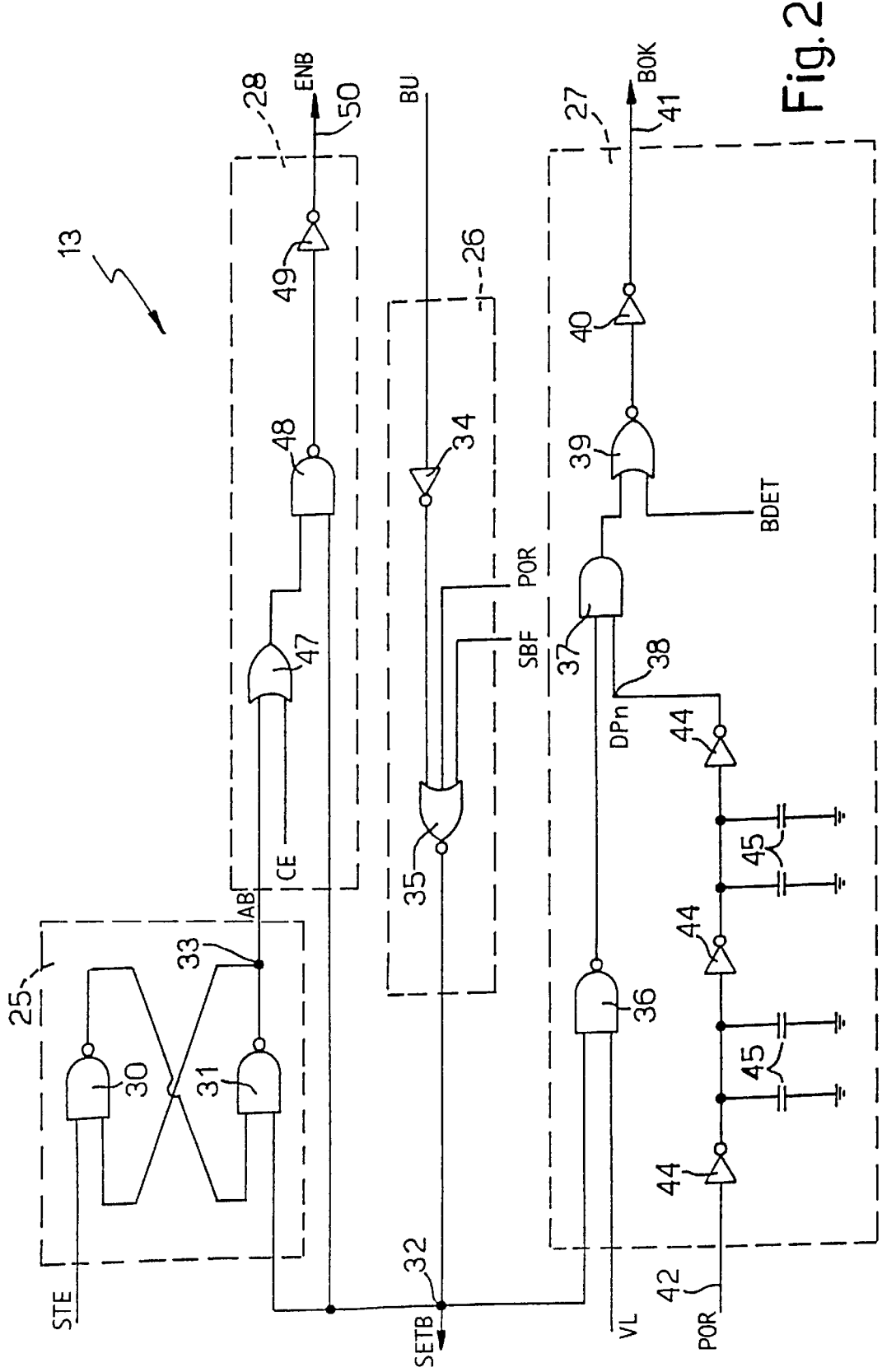
FIGS. 2 to 4 show schematic diagrams of possible embodiments of parts of the booster device shown in FIG. 1.

Boost control stage 13 is shown in detail in FIG. 2, and substantially comprises an autoboost circuit 25; a boost preset circuit 26; a memory read enabling circuit 27; and a boost enabling circuit 28.

More specifically, autoboost circuit 25 is formed by a flip-flop, and comprises two NAND gates 30 and 31; NAND gate 30 includes a first input receiving signal STE, a second input connected to the output of NAND gate 31, and an output connected to a first input of NAND gate 31; and NAND gate 31 includes a second input connected to a node 32 and receiving signal SETB, and an output defining a node 33 presenting a signal AB.

Boost preset circuit 26 comprises an inverter 34 receiving signal BU; and a three-input NOR gate 35, one input of which is connected to the output of inverter 34, the other inputs of which receive signals POR and SBF, and the output of which defines node 32.

Memory read enabling circuit 27 comprises a NAND gate 36 having one input connected to node 32, another input receiving signal VL, and an output connected to one input of an AND gate 37, which includes another input connected to a node 38 presenting an inverted delayed-power-on signal DPn; the output of AND gate 37 is connected to one input of a NOR gate 39, another input of which receives signal BDET, and the output of which is connected to an inverter 40, the output (node 41) of which presents signal BOK. Node 38 is coupled to an input 42 of circuit 27, which supplies the power-on-reset POR signal, via a cascade of inverters 44 and capacitors 45 forming a delaying and inverting branch, so that signal DPn is delayed and inverted in relation to the POR signal.

Boost enabling circuit 28 comprises an OR gate 47 having a first input connected to node 33, a second input receiving signal CE, and an output connected to one input of a NAND gate 48, another input of which is connected to node 32, and the output of which is connected to an inverter 49 generating signal ENB at output node 50.

Boost control stage 13 in FIG. 2 operates as follows. When memory 1 is turned on, the POR signal is high; signal BDET is low; and signals STE, BU and VL are high. Assuming signal SBF is low (memory element set and the boost condition enabled), then the output of NOR gate 35 and signal SETB are low; the output of NAND gate 48 is high and signal ENB is low; all boost activity is therefore disabled as explained below; and the low SETB signal sets flip-flop 25 so that signal AB is high to preset the autoboost condition after power-on, and produces a high output of NAND gate 36. On the other hand, DPn is low, the output of AND gate 37 is low, and signal BOK is low indicating an unstable condition unsuitable for reading the cells.

The same boost disabling condition (signals SETB and ENB low) also applies when memory element 18 is not set (signal SBF high) and when programming the memory array (signal BU low).

The high STE signal, together with the reset condition produced by the high AB signal, maintains a low logic level at the input of NAND gate 31 not connected to node 32, so as to enable autoboost circuit 25. Consequently, when the POR signal switches to low after turn-on, and signal SETB switches to high, flip-flop 25 nevertheless maintains a high AB signal and a high output of OR gate 47 despite signal CE being low; NAND gate 48, receiving two "1", switches to low; and signal ENB at output 50 switches to high. At this phase, in which supply voltage $V_{DD}$ is increasing to its steady-state value, VL is definitely still high; the output of NAND gate 36 switches to low; and signal DPn, which switches with a given delay in relation to the POR signal, is still low, so that the output of AND gate 37 is low, BDET is still low, and signal BOK remains low. At this phase, the delay in the switching of DPn in relation to the POR signal prevents gate 37 (and hence signal BOK) from switching in the brief interval between the switching of the POR signal and signal SETB.

Upon supply voltage $V_{DD}$ reaching a high operating value (VL switches to low), gate 36 switches to high and, as soon as DPn switches to "1", switches signal BOK to high to indicate the read condition has been reached. Similarly, when BDET switches to high, signal BOK also switches to high.

When high, signal CE in stage 13 maintains a high output of gate 47 regardless of the condition of autoboost flip-flop 25, so that signal ENB remains high and the boost condition remains enabled. Conversely, if CE is low, signal ENB is high as long as signal AB generated by autoboost flip-flop 25 remains high, and switches to low (to disable the boost condition) when AB switches to low.

The above enabling procedure following turn-on of memory 1 also applies at the end of programming, when signal BU switches back to high.

Figure 3:
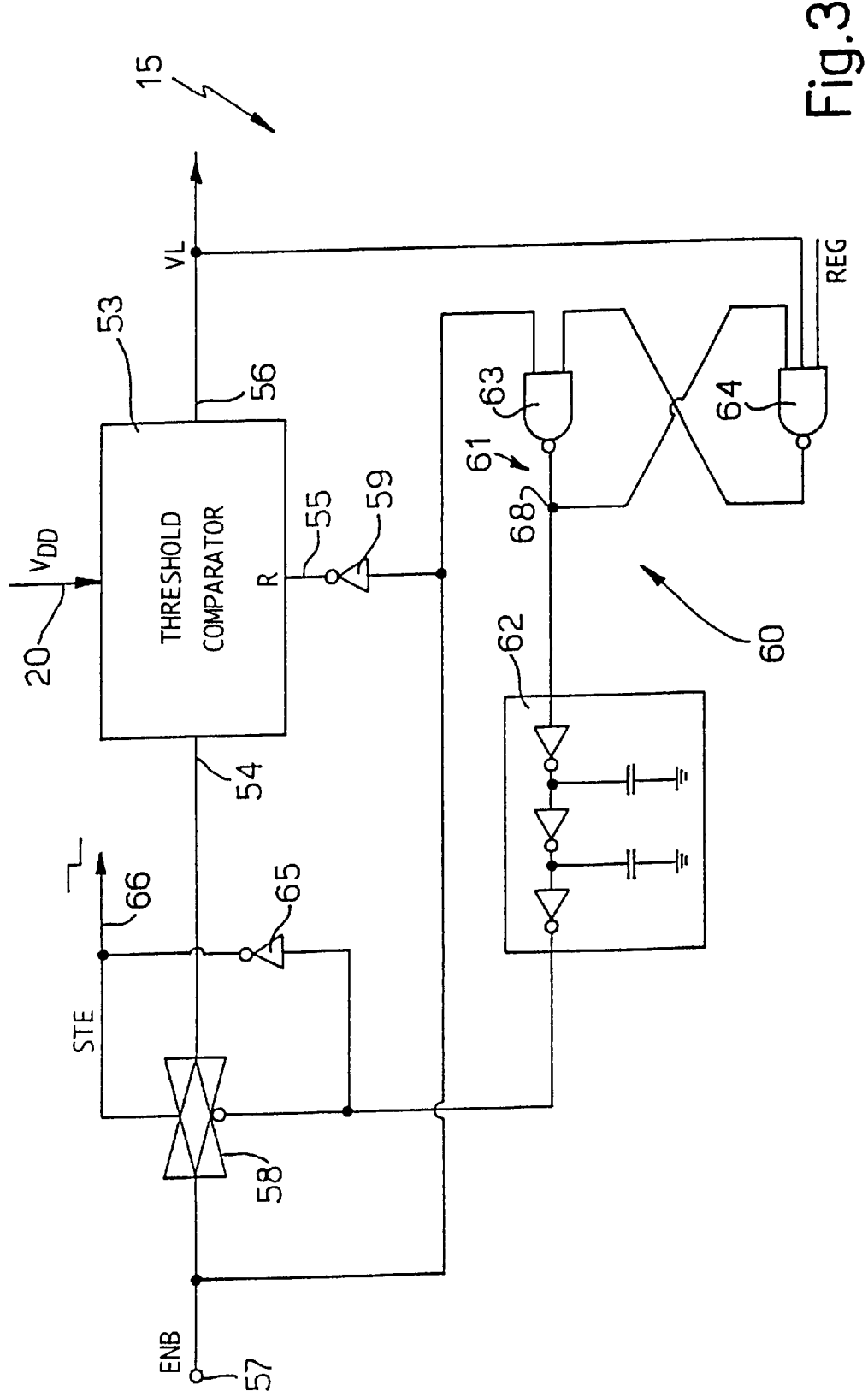

When VL switches, or when regulation of pumps 10 and 11 is established, signal STE switches to low with a given delay, as will be seen with reference to FIG. 3, so as to switch the output of NAND gate 30 to high and the output of NAND gate 31 (signal AB) to low. Once the booster device is stabilized, the autoboost condition is disabled and can only be reactivated when memory 1 is initialized (by the POR signal) or programmed, as described above. Consequently, when memory 1 switches to standby (signal CE supplied by logic stage 5 switches to low), signal ENB also switches to low, even if SETB remains high.

The basic structure of supply detecting stage 15 is shown in FIG. 3. Stage 15, which is described and illustrated in detail with reference to FIG. 6 in European Patent Application n. 95830360.4 of 4 Aug. 1995, incorporated herein by reference, comprises a threshold comparator 53 (e.g., employing a memory cell as in boost regulating stage 12) connected to supply line 20 at $VD_{DD}$, and having an enabling input 54, a disabling input 55, and an output 56 generating signal VL, the high value of which indicates a low supply voltage (e.g., below 4 V). Input 54 is coupled to an input 57 of stage 15, which supplies signal ENB, via a switch 58 having a pair of complementary control terminals; and input 55 is coupled to the same input 57 of stage 15 via an inverter 59.

Stage 15 also comprises a disabling network 60 for disabling stage 15 when supply voltage $V_{DD}$ reaches the set threshold value, or when the regulating function is activated. Network 60 substantially comprises a flip-flop 61, and an inverting delay block 62. Flip-flop 61 comprises first and second NAND gates 63 and 64. NAND gate 63 has a first input connected to the output 56 of threshold comparator 53, a second input connected to the output of NAND gate 64, and an output 68 connected to inverting delay block 62. NAND gate 64 has a first input connected to the output of gate 63, a second input connected to the output 56 of threshold comparator 53, and a third input receiving signal REG.

The output of inverting delay block 62 is connected to the power-off terminal of switch 58 and to the input of an inverter 65, the output 66 of which is connected to the power-on terminal of switch 58 and supplies signal STE.

Supply detecting stage 15 operates as follows. To begin with, when ENB is low, the output 68 of gate 63 is high, the output of inverting block 62 is low, and STE is high; switch 58 is therefore turned on. Threshold comparator 53 receives the low ENB signal at set input 54, a high signal at reset input 55, and is therefore reset; VL is high; and NAND gate 64, receiving three high input signals, supplies NAND gate 63 with a low signal to confirm the present state.

When ENB switches to high, threshold comparator 53, receiving a high signal at set input 54 and a low signal at reset input 55, is enabled. VL, however, remains high as long as supply voltage $V_{DD}$ remains below the predetermined threshold, so that NAND gate 64 does not switch, and maintains a "0" at the input of gate 63, so that disabling network 60 does not switch. Network 60 only switches when supply voltage $V_{DD}$ reaches the predetermined high threshold value (VL switches to low) or when the memory switches to regulating mode (REG switches to low). In both cases, the presence of a "0" at the input of NAND gate 64 switches output 68 of flip-flop 61 to low. After a delay determined by block 62, the output of block 62 itself switches to high, thus switching STE to low and opening switch 58. Input 54 of threshold comparator 53 no longer receives the enabling signal and is therefore disabled But, since the signal at input 55 is still low, comparator 53 does not alter the former level of signal VL; and any changes to signal REG have no effect on the present condition, unless a standby or programming condition switches ENB to low, thus resetting stage 15.

Boost detecting stage 16, an advantageous embodiment of which is illustrated and described with reference to FIG. 3 in European Patent Application n. 95830363.4 of 4 Aug. 1995, incorporated herein by reference, substantially comprises a threshold element (preferably using a memory cell) connected to boost line 21 and enabled by signal RUP. When signal RUP is high, detecting stage 16 monitors boost voltage $V_B$ and generates signal BDET, which is low as long as boost voltage $V_B$ remains below a predetermined threshold, and switches to high when the threshold is exceeded. Signal BDET is also low when detecting stage 16 is disabled.

Figure 4:
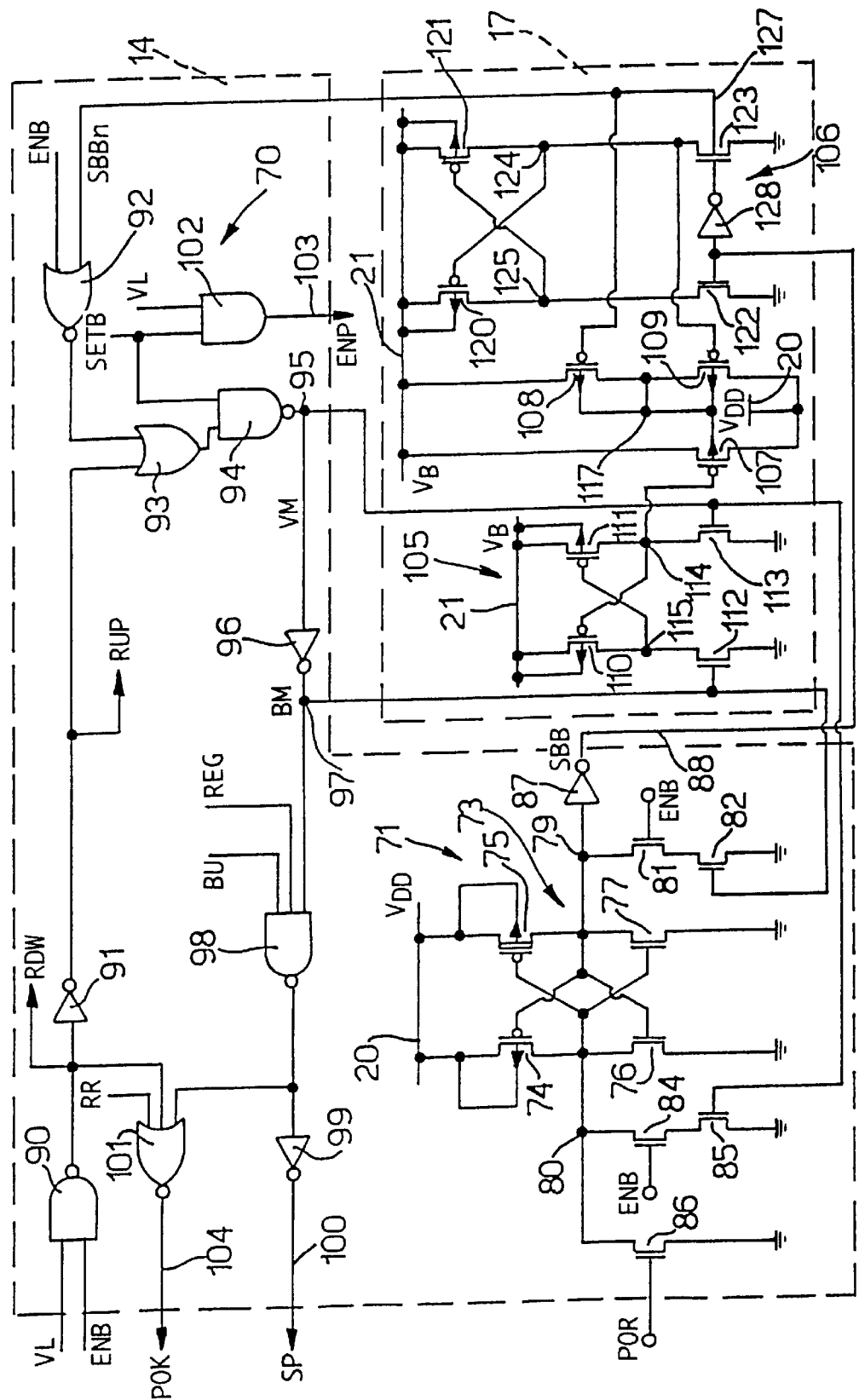

The structure of pump control stage 14 and switching circuit 17 is shown in detail in FIG. 4. More specifically, pump control stage 14 comprises a control circuit 70 and a standby set circuit 71.

Standby set circuit 71 comprises a flip-flop 73 comprising two PMOS transistors 74 and 75 and two NMOS transistors 76 and 77. PMOS transistors 74 and 75 have source terminals connected to supply line 20 at $V_{DD}$, gate terminals connected to respective nodes 79 and 80, and drain terminals connected to respective nodes 80 and 79; and transistor 75 is a native type with a high threshold. NMOS transistors 76 and 77 have source terminals that are grounded, gate terminals connected to respective nodes 79 and 80, and drain terminals connected to respective nodes 80 and 79.

Node 79 is grounded via two NMOS transistors 81 and 82 in series, the gate terminals of which receive signal ENB from boost control stage 13, and signal BM generated by control circuit 70, respectively. Node 79 is also connected to the input of an inverter 87, the output (node 88) of which supplies signal SBB. Node 80 is grounded via two NMOS transistors 84 and 85 in series, the gate terminals of which respectively receive signal ENB, and signal VM generated by control circuit 70. Node 80 is also grounded via an NMOS transistor 86, the control terminal of which receives the power-on-reset POR signal from stage 5.

Control circuit 70 comprises a NAND gate 90, the inputs of which receive signals VL and ENB, and the output of which generates signal RDW; an inverter 91 connected to the output of NAND gate 90; and a NOR gate 92, one input of which receives a signal SBBn (inverted in relation to SBB) generated by switching circuit 17, and the other input of which receives signal ENB. The output of inverter 91 (presenting signal RUP) and the output of NOR gate 92 are connected to the inputs of an OR gate 93, the output of which is connected to one input of a NAND gate 94, the other input of which receives signal SETB from stage 13. The output of NAND gate 94 defines a node 95 presenting signal VM, and is connected to an inverter 96, the output of which defines a node 97 presenting signal BM. Node 97 is connected to one input of a three-input NAND gate 98, which also receives signals REG and BU; and the output of NAND gate 98 is connected to an inverter 99, the output (node 100) of which supplies signal SP to standby pump 11.

Control circuit 70 also comprises a NOR gate 101 having a first input connected to the output of NAND gate 90, a second input connected to the output of NAND gate 98, a third input receiving signal RR from stage 5, and an output 104 supplying signal POK; and an AND gate 102 having two inputs supplied with signals SETB and VL, and an output 103 supplying signal ENP to standby pump 11.

Switching circuit 17 comprises first and second latches 105 and 106 connected between boost line 21 and ground and controlling, respectively, a transistor 107, and a pair of push-pull transistors 108 and 109 (connecting the well region of transistor 107 to the highest voltage point at all times). More specifically, latch 105 comprises two PMOS transistors 110 and 111 and two NMOS transistors 112 and 113. PMOS transistors 110 and 111 have source terminals and well regions connected to boost line 21 at $V_B$, gate terminals connected to respective nodes 114 and 115, and drain terminals connected to respective nodes 115 and 114. NMOS transistors 112 and 113 have source terminals that are grounded, gate terminals connected to respective nodes 97 and 95 of control circuit 70, and drain terminals connected to respective nodes 115 and 114.

Node 114 is connected to the gate terminal of PMOS transistor 107, which has its source terminal connected to supply line 20 at $V_{DD}$, its drain terminal connected to boost line 21 at $V_B$, and its well region connected to a node 117.

Latch 106 comprises two PMOS transistors 120 and 121, and two NMOS transistors 122 and 123. More specifically, PMOS transistors 120 and 121 have source terminals and well regions connected to boost line 21, gate terminals connected to respective nodes 124 and 125, and drain terminals connected to respective nodes 125 and 124. NMOS transistors 122 and 123 have the source terminals that are grounded, gate terminals connected respectively to node 88 of boost preset circuit 71 and to the output 127 of an inverter 128 (generating signal SBBn supplied to control circuit 70), and the drain terminals connected to respective nodes 125 and 124.

PMOS transistor 109 has its source terminal connected to supply line 20, its gate terminal connected to node 124 of latch 106, and its drain terminal and well region connected to node 117; and PMOS transistor 108 has its source terminal connected to boost line 21, its gate terminal connected to node 127, and its drain terminal and well region connected to node 117.

The FIG. 4 circuit operates as follows. When memory 1 is turned on, the high POR signal keeps node 80 low, node 79 high, and node 88 (signal SBB) low; and, as stated previously, ENB and SETB are low, and VL is high. The low SETB signal produces a high output of NAND gate 94, so that VM is high, BM is low, SP and POK are low, and signal ENP at output 103 of AND gate 102 is low, so that pumps 10 and 11 are turned off. As VM is high and BM is low, transistor 113 of switching circuit 17 is turned on, node 114 is low, and transistor 107 is turned on to connect boost line 21 to supply line 20, so that, at turn-on, boost voltage $V_B$ follows the increase in supply voltage $V_{DD}$ almost exactly, i.e., with substantially no losses. As SBB is low, transistor 122 is turned off, transistor 123 is turned on, node 124 is low, and node 125 is high, so that transistor 109 is turned on and connects the well region of transistor 107 (node 117) to supply line 20, transistor 108 is turned off, and signal SBBn is high.

The above condition at power-on with the POR signal enabled (pumps disabled, boost line 21 connected to supply line 20) also applies when memory element 18 (FIG. 1) is not set (SBF high) and when memory 1 is being programmed (BU high), in that both conditions result in a low SETB signal.

When signal SETB switches to high at the end of the power-on phase, it enables gates 94 and 102, and no longer has any effect on the operation of pump control stage 14 or switching circuit 17, unless the boost condition is disabled by SBF or BU.

Switching of signal ENB to high (with signals VL, REG, BU stable in the high state, and signal RR stable in the low state) switches gates 90, 91, 93 and 94. Signal ENP at the output of gate 102 switches to high to enable pumps 10 and 11. The device switches to boost mode with VM low and BM high, so that gates 98, 99 and 101 switch, and signals SP and POK (for respectively activating standby pump 11 and main pump 10) switch to high to activate both pumps.

The switching of signals VM and BM also switches latch 105, node 114 of which switches to high to turn off transistor 107. Boost line 21 is disconnected from supply line 20; and flip-flop 73 also switches to switch signal SBB to high, to memorize activation of pumps 10 and 11, and to switch latch 106. More specifically, transistor 122 is turned on; transistor 123 is turned off; node 124 switches to high to turn off transistor 109; node 127 (signal SBBn) switches to low to turn on transistor 108; the well region of transistor 107 (node 117) is connected to boost line 21, now higher than supply line 20; and the low switching of SBBn has no effect on the state of NOR gate 92, in view of the high value of signal ENB.

If, as it increases, supply voltage $V_{DD}$ reaches the predetermined threshold value of supply detecting stage 15, and signal VL switches to low, then, as stated above, NAND gate 90 of control circuit 70 switches, signal RDW switches to high, and signal RUP switches to low, thus disabling boost regulating stage 12 and boost detecting stage 16 as explained above. Moreover, since the output of NOR gate 92 was also low (ENB=1), the output of OR gate 93 switches to low, signal VM again switches to high, and signal BM switches to low to return to supply voltage mode. Consequently, flip-flop 73 switches to the initial state, i.e., with signal SBB low; latch 105 switches so that node 114 switches to low; transistor 107 is turned back on to reconnect boost line 21 to supply line 20; latch 106 switches; node 127 (signal SBBn) switches to high; transistor 108 is turned off; transistor 109 is turned on to reconnect the well region of transistor 107 to supply line 20; and signals SP, POK and ENP switch to low to disable both pumps 10 and 11.

Conversely, when memory 1 operates at low voltage and signal VL remains high, pump control stage 14, even after BDET switches, remains in the boost condition with signal VM low, signal BM high, signal SBB high, signal SBBn low, and with boost line 21 disconnected from supply line 20. When boost regulating stage 12 is activated and output signal REG commences the switching sequence, pumps 10 and 11 are controlled by signals SP and POK so as to be turned off and on when boost line 21 respectively exceeds and is below the threshold of boost regulating stage 12.

If signal BU switches to low in boost mode (during programming), it switches signals POK and SP to low to turn off both pumps and also reset the whole of pump control stage 14 due to the low SETB signal. Conversely, low-to-high switching of signal RR when reading the memory array only switches signal POK to low, so that only main pump 10 is turned off, and standby pump 11 continues operating to prevent a sharp variation, and hence noise, on boost line 21 when evaluating the data.

When memory 1 switches to standby and signal CE switches to low, as stated above, boost control stage 13 switches signal ENB to low, so that flip-flop 73 is frozen in the state memorized previously by transistors 81 and 84 being turned off and cutting off the connection between standby set circuit 71 and control circuit 70. The switching of signal ENB also disables NAND gate 90, the output (signal RWD) of which switches to high, regardless of signal VL, to disable boost regulating stage 12.

If, before signal ENB switched, signal SBB was low and signal SBBn was high (high supply voltage, pumps 10 and 11 turned off), then the output of NOR gate 92 remains low. Since signal RUP is low, the output of OR gate 93 remains low, and the output of NAND gate 94 is high, so that VM is high and BM low. Signal SP is therefore maintained low; and signal POK is maintained low by the high RDW signal.

Conversely, if signal SBBn was low (boost condition) before signal ENB switched, then the output of gate 92 and the output of OR gate 93 switch to high, so that signal VM remains low and signal BM high. And since, as stated above, signals REG, VL and BU are high, signals SP and ENP are maintained high, whereas signal POK switches to low on account of the high RDW signal, so that only standby pump 11 is operated and main pump 10 is disabled.

In standby mode, switching circuit 17 remains in the previously set state, i.e., with transistor 107 turned off and boost line 21 isolated from supply line 20 in the case of boost mode, and with transistor 107 turned on and boost line 21 connected to supply line 20 in the case of high-voltage mode.

When signal ENB switches back to high at the end of standby, stages 14, 15 and 16 are reset, supply voltage $V_{DD}$ and boost voltage $V_B$ are again monitored, and the pumps are again controlled by control stage 14.

Pumps 10 and 11 may be formed in any known manner. For example, advantageous solutions regarding the main pump and the standby pump are described respectively in U.S. patent application Ser. No. 08/684,192 (filed on Jul. 18, 1996), and in copending European Patent Application entitled "Standby voltage booster stage for a memory device", both filed by the present Applicant; and both incorporated herein by reference.

Figure 5:
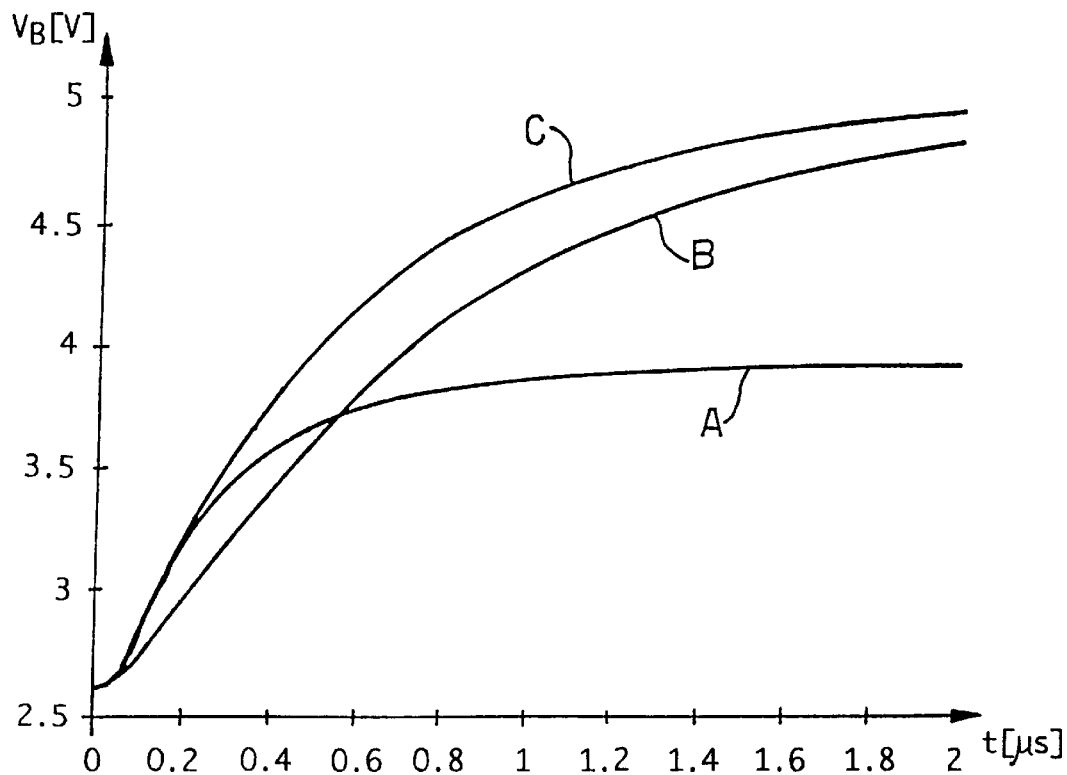
FIGS. 5 and 6 show time plots of a number of electric quantities as they might be measured as the memory device shown in FIG. 1 is operated.

By forming the pumps so that the main pump is capable of bringing the boost voltage to $3V_{DD}-2V_T$ (where $V_T$ is the gate-source voltage drop of the switches for discharging the capacitors) and the standby pump is capable of bringing the boost voltage to $2V_{DD}-V_T$, a more efficient pumping effect is achieved at the initial boost phase by first exploiting the greater initial speed of standby pump 11 and then the greater capacity of main pump 10, as shown in the FIG. 5 plot, in which curve A indicates pull-up of boost line 21 by standby pump 11 only, curve B by main pump 10 only, and curve C by the combined effect of both pumps 10 and 11 as described above.

Figure 6:
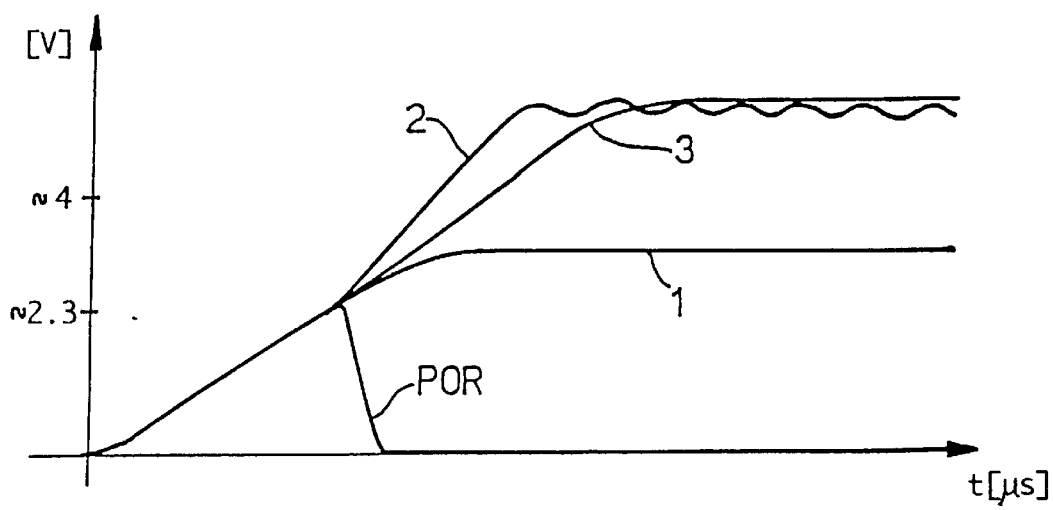

FIG. 6 shows a graph of supply voltage $V_{DD}$ and boost voltage $V_B$ during turn-on and immediately following disabling of the POR signal. In particular, curves 1 and 2 show $V_{DD}$ and $V_B$, respectively, in the case of a low supply voltage (3 V), and curve 3 shows $V_{DD}$ in the case of a high supply voltage (5 V) increasing more slowly than $V_B$. The plot also shows the POR signal and the trigger level of supply and boost detecting stages 15 and 16.

The advantages of the device described are as follows. It is enabled and configured flexibly by programming a memory element; it automatically sets the operating mode (with or without the boost function) according to a predetermined low supply voltage; it presents no power consumption in high-voltage operating mode or when the supply line is stabilized, and very little power consumption in boost operating mode; and it provides for altering the operating mode setting corresponding to changes in previous supply conditions by automatically disabling the boost function when the low supply voltage condition ceases.

By virtue of supply line 20 and boost line 21 being connected directly when the device is turned on (POR signal enabled), boost line 21, at the start of the next autoboost phase, is pulled up by pumps 10 and 11 from the maximum available value (the $V_{DD}$ value reached at that point) with no losses due to voltage drops across other components. Moreover, at the power-on phase, pumps 10 and 11 are turned off and therefore in no way hinder pull-up of the boost line, while the efficiency of the next pumping phase is enhanced by the presence of both pumps, as stated above.

The supply detecting stage monitors the supply line each time the device is turned on and reset (after standby and programming), and is turned off automatically to avoid unnecessary consumption when a stable supply condition is reached, with a given delay to prevent minor transient states from cutting off the monitoring function before the device is stabilized.

To prevent read errors, the device only enables the read functions when appropriate voltage levels, monitored by detecting stages 15 and 16, have been reached.

Clearly, changes may be made to the device as described and illustrated herein without departing from the scope of the present invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A voltage booster device for a memory device, comprising:

a first line at a first reference potential;

a second line at a second reference potential;

a first voltage booster stage connected to said first and second lines;

a supply detecting stage connected to said first line, for generating a first level signal when said first reference potential exceeds a first predetermined level;

a boost detecting stage connected to said second line, for generating a second level signal when said second reference potential exceeds a second predetermined level;

a regulating stage connected to said second line and connected to said boost detecting stage to receive said second level signal therefrom;

a pump control stage connected to receive said first level signal for generating a first activating signal for activating said regulating stage in the absence of said first level signal; and a boost control stage including boost self-activating means receiving a power-on reset signal, said first level signal and said second level signal, and for generating second activating signal; and boost enabling means for generating an enabling signal for said pump control stage and said supply detecting stage in the absence of said power-on reset signal and said first and second level signals and in the presence of said second activating signal;

said regulating stage generating a regulating signal in the presence of said second level signal and said first activating signal, and when said second reference potential exceeds a third predetermined level; and said pump control stage generating a first pump activating signal for said first booster stage in the absence of said first level signal and said regulating signal.

2. A device as claimed in claim 1, further comprising a second booster stage connected between said first and second lines.

3. A device as claimed in claim 2, wherein said pump control stage comprises a first output connected to said first voltage booster stage and supplying said first pump activating signal; a second output connected to said second voltage booster stage and supplying a second pump activating signal; and third logic means connected to said first logic means, to said first input and said first and second outputs of said pump control stage, receiving said enabling and operating mode signals, generating said first pump activating signals in the presence of said enabling signal and said second logic state of said operating mode signal, and generating said second pump activating signal in the absence of said enabling signal and said second logic state of said operating mode signal.

4. A device as claimed in claim 3, wherein said logic means comprises first disabling means receiving said regulating signal and a programming signal, and disabling said first and second pump activating signals in the presence of said regulating and programming signals.

5. A device as claimed in claim 1, wherein said boost enabling means has an input receiving a standby signal and an input receiving line said power-on reset signal, and generates said enabling signal in the absence of said power-on reset and standby signals.

6. A device as claimed in claim 5, wherein said supply detecting stage comprises a first input receiving said enabling signal; a second input receiving said regulating signal; an output supplying said first level signal; a detecting circuit connected to said first input and to said first line; and a self-disabling circuit connected to said output of said supply detecting stage and to said second input, and generating a disabling signal disabling said supply detecting stage on receiving said first level signal or said regulating signal.

7. A device as claimed in claim 5, wherein said pump control stage comprises a first input receiving said first level signal; a second input receiving said enabling signal; and first logic means connected to said first and second inputs of said pump control stage and generating an operating mode signal having a first and second logic state respectively indicating a supply operating mode and a boost operating mode; said operating mode signal presenting said first logic state in the presence of said first level signal and said enabling signal, and said second logic state in the presence of said enabling signal and in the absence of said first level signal.

8. A device as claimed in claim 7, wherein said first logic means comprises initialization set means receiving said power-on reset signal and determining said first logic state of said operating mode signal in the presence of said power-on reset signal.

9. A device as claimed in claim 8, wherein said pump control stage comprises memory means receiving said operating mode signal and generating a mode memory signal; and second logic means connected to said memory means, to said second input of said pump control stage, and to said first logic means, and determining said first logic state of said operating mode signal in the absence of said enabling signal and in the presence of a first value of said mode memory signal, and determining said second logic state in the absence of said enabling signal and in the presence of a second value of said mode memory signal.

10. A device as claimed in claim 9, wherein said pump control stage comprises reset means receiving said power-on reset signal, connected to said memory means and determining said first value of said mode memory signal in the presence of said power-on reset signal.

11. A device as claimed in claim 8, further comprising a switching stage interposed between said first and second lines and having a control input receiving said operating mode signal; said switching stage being closed and connecting said first and second lines in the presence of said first logic state of said operating mode signal, and being open and disconnecting said first and second lines in the presence of said second logic state of said operating mode signal.

12. A device as claimed in claim 11, wherein said switching stage comprises a MOS transistor having a first terminal connected to said first line, a second terminal connected to said second line, and a control terminal connected to said control input.

13. A device as claimed in claim 5, wherein said boost control stage further comprises boost disabling means receiving a disabling signal for disabling said boost enabling means in the presence of said disabling signal.

14. A device as claimed in claim 5, wherein said boost control stage comprises read level indicating means receiving said first and second level signals and said power-on reset signal, and generating a read level signal in the presence of said first or second level signal and in the absence of said power-on reset signal.

15. A voltage booster circuit for a memory device, comprising:

a first voltage booster stage that receives a first voltage and provides a second voltage on a boost line that is greater than the first voltage;

a first voltage level detecting stage that receives the first voltage and provides a first output signal in a first state when the first voltage exceeds a first threshold voltage level; and a boost control stage that, responsive to the first output signal being in the first state, causes the first voltage booster stage to be disabled and causes the first voltage to be provided on the boost line.

16. The voltage booster circuit as claimed in claim 15, further comprising a second voltage level detecting stage that receives the second voltage and provides a second output signal in a second state when the second voltage exceeds a second threshold voltage level, and wherein, if the second output signal changes to the second state before the first output signal changes to the first state, then the boost control stage causes the first voltage booster stage to be disabled and the first voltage to be provided on the boost line responsive to the first output signal being in the first state when the first output signal changes to the first state prior to a predetermined time after the second output signal changes to the second state.

17. The voltage booster circuit as claimed in claim 15, further comprising a boost regulating stage that receives the second voltage and, responsive thereto, regulates operation of the first voltage booster stage.

18. The voltage booster circuit as claimed in claim 17, wherein the boost regulating stage is arranged such that, responsive to the first output signal being in the first state, the boost regulating stage is disabled.

19. The voltage booster circuit as claimed in claim 15, further comprising a second voltage booster stage and a pump control circuit, the pump control circuit being arranged to selectively disable at least one of the first and second voltage booster stages responsive to current operating conditions at the voltage booster circuit.

20. The voltage booster circuit as claimed in claim 19, wherein the second voltage booster stage and the pump control circuit are arranged such that, responsive to the first output signal being in the first state, the second booster stage and the pump control stage are disabled.

21. The voltage booster circuit as claimed in claim 15, wherein the boost control circuit is arranged to be set in to an auto-boost mode after receiving a particular input signal, and responsive to a state of the first output signal, the boost control circuit causes one of a high voltage operation mode and a low voltage operating mode to be selected, the first voltage booster stage being disabled and the first voltage being provided on the boost line when the high voltage operating mode is selected.

22. The voltage booster circuit as claimed in claim 21, further comprising a memory element coupled to the boost control circuit, data stored in the memory element selectively enabling the auto-boost mode of the boost control circuit.

23. The voltage booster circuit as claimed in claim 21, wherein the first voltage level detecting stage is arranged so as to be disabled when the low voltage operating mode is selected.

24. The voltage booster circuit as claimed in claim 15, further comprising a second voltage level detecting stage that receives the second voltage and provides a second output signal in a second state when the second voltage exceeds a second threshold voltage level, wherein the boost control circuit is arranged to be set into an auto-boost mode after receiving a particular input signal, and responsive to states of the first and second output signals, the boost control circuit causes one of a high voltage operating mode and a low voltage operating mode to be selected, the first voltage booster stage being disabled and the first voltage being provided on the boost line when the high voltage operating mode is selected.

25. The voltage booster circuit as claimed in claim 24, wherein the second voltage level detecting stage is arranged so as to be disabled when the high voltage operating mode is selected.

26. The voltage booster circuit as claimed in claim 15, further comprising a switching circuit arranged such that, when the first output signal is in the first state, the first voltage is provided on the boost line.

27. A voltage booster circuit for used with a memory device, comprising:

a first voltage booster stage that receives a first voltage and provides a second voltage on a boost line that is greater than the first voltage;

a first voltage level detecting stage that receives the first voltage and provides a first output signal in a first state when the first voltage exceeds a first threshold voltage level; and means for, responsive to the first output signal being in the first state, causing the first voltage booster stage to be disabled and the first voltage to be provided on the boost line.

28. A method for controlling a voltage provided to a memory device, comprising the steps of:

providing a supply voltage to a voltage booster stage that provides a boosted voltage to a boost line that is higher than the supply voltage;

providing the supply voltage to a supply detecting stage that provides an output signal in a particular state when the supply voltage is greater than a threshold voltage level; and responsive to the output signal being in the particular state, disabling the voltage booster stage and providing the supply voltage on the boost line.

* * * * *